US008984293B2

(12) United States Patent
Layson et al.

(10) Patent No.: US 8,984,293 B2
(45) Date of Patent: Mar. 17, 2015

(54) SECURE SOFTWARE PRODUCT IDENTIFIER FOR PRODUCT VALIDATION AND ACTIVATION

(75) Inventors: Thomas J. Layson, Monroe, WA (US); Caglar Gunyakti, Redmond, WA (US); Tarik Soulami, Redmond, WA (US); Kalin Georgiev Toshev, Redmond, WA (US); Jeffrey Paul Harker, Snoqualmie, WA (US); Josh D. Benaloh, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 158 days.

(21) Appl. No.: 12/950,777

(22) Filed: Nov. 19, 2010

(65) Prior Publication Data

US 2012/0131349 A1    May 24, 2012

(51) Int. Cl.
*G06F 21/00* (2013.01)
*G06F 21/12* (2013.01)

(52) U.S. Cl.
CPC .................... *G06F 21/121* (2013.01)
USPC ............ 713/182; 380/277; 380/286; 726/2; 726/21; 726/30

(58) Field of Classification Search
USPC ............ 713/182; 326/8, 277, 286; 707/203; 726/2, 21, 30
See application file for complete search history.

(56) References Cited

U.S. PATENT DOCUMENTS

| | | | |
|---|---|---|---|
| 5,745,879 A | 4/1998 | Wyman | |
| 6,029,145 A | 2/2000 | Barritz et al. | |
| 6,223,291 B1 | 4/2001 | Puhl et al. | |
| 6,898,286 B2 | 5/2005 | Murray | |
| 7,149,722 B1 | 12/2006 | Abburi | |
| 7,444,506 B1 * | 10/2008 | Datta et al. | 713/153 |

(Continued)

FOREIGN PATENT DOCUMENTS

| | | |
|---|---|---|
| CN | 1816822 A | 8/2006 |
| WO | WO 2010092655 | 8/2010 |

OTHER PUBLICATIONS

"International Search Report", Mailed Date: Apr. 10, 2012, Application No. PCT/US2011/059693, Filed Date: Nov. 8, 2011, pp. 9.

(Continued)

*Primary Examiner* — Kambiz Zand
*Assistant Examiner* — Sharif E Ullah
(74) *Attorney, Agent, or Firm* — John Jardine; Kate Drakos; Micky Minhas

(57) ABSTRACT

Systems, methods, and apparatus for generating and validating product keys. In some embodiments, a product key includes security information and identification information identifying at least one copy of a software product. The identifying information may be used to access validation information from at least one source other than the product key, and the validation information may be used to process the identification information and the security information to determine whether the product key is valid. In some further embodiments, the security information includes a first portion to be processed by a first validation authority using first validation information and a second portion to be processed by a second validation authority using second validation information, wherein the second validation information is stored separately from the first validation information.

20 Claims, 7 Drawing Sheets

(56) References Cited

U.S. PATENT DOCUMENTS

| | | | |
|---|---|---|---|
| 2002/0059570 | A1 | 5/2002 | Yoo |
| 2002/0174356 | A1 | 11/2002 | Padole |
| 2003/0149670 | A1* | 8/2003 | Cronce ............... 705/59 |
| 2003/0156719 | A1 | 8/2003 | Cronce |
| 2004/0044629 | A1 | 3/2004 | Rhodes et al. |
| 2004/0093599 | A1* | 5/2004 | Reynaud ............ 717/177 |
| 2004/0194083 | A1 | 9/2004 | Hindle |
| 2004/0268120 | A1 | 12/2004 | Mirtal et al. |
| 2005/0146966 | A1 | 7/2005 | Kawamura |
| 2005/0188228 | A1 | 8/2005 | DeMello et al. |
| 2005/0195978 | A1 | 9/2005 | Babic et al. |
| 2005/0289072 | A1 | 12/2005 | Sabharwal |
| 2006/0089912 | A1 | 4/2006 | Spagna et al. |
| 2006/0195689 | A1 | 8/2006 | Blecken et al. |
| 2007/0050850 | A1* | 3/2007 | Katoh et al. ............. 726/27 |
| 2008/0040701 | A1 | 2/2008 | Stern |
| 2008/0114695 | A1 | 5/2008 | Gutierrez |
| 2008/0189549 | A1* | 8/2008 | Hughes ............... 713/171 |
| 2008/0319779 | A1 | 12/2008 | Hughes et al. |
| 2009/0089881 | A1 | 4/2009 | Indenbom |
| 2009/0094372 | A1 | 4/2009 | Nyang et al. |
| 2009/0216861 | A1 | 8/2009 | Shiely et al. |
| 2010/0250400 | A1 | 9/2010 | Fernandez Gutierrez |
| 2011/0055925 | A1 | 3/2011 | Jakobsson |
| 2011/0098030 | A1 | 4/2011 | Luoma |

OTHER PUBLICATIONS

Inside Windows Product Activation, published Jul. 2001, http://www.licenturion.com/xp/fully-licensed-wpa.txt.

Product Activation Based on RSA Signatures, published Jun. 6, 2007, http://www.codeproject.com/KB/security/ProductActivation.aspx.

"International Search Report", Mailed Date: May 30, 2012, Application No. PCT/US2011/063462, Filed Date: Dec. 6, 2011, pp. 9.

Non-Final Office Action mailed Feb. 19, 2013 in U.S. Appl. No. 12/950,627, 19 pages.

Final Office Action mailed Mar. 14, 2013 in U.S. Appl. No. 12/968,021, 14 pages.

"Windows 7 Ultimate Cracked and Activated Permanently with OEM SLP Master Product Key (with SLIC 2.1)", Retrieved at <<http://www.mydigitallife.info/2009/07/29/windows-7-ultimate-cracked-and-activated-permanently-with-oem-slp-master-product-key-with-slic-2-1/>>, Jul. 29, 2009, pp. 12.

Seleborg, Svante., "Axantum Strong Software Licensing", Retrieved at <<www.axantum.com/axcrypt/etc/Axantum-Strong-Licensing.pdf>>, Version 0.3, 2004, pp. 6.

"Windows Activation Technologies in Windows 7", Retrieved at <<http://technet.microsoft.com/en-us/library/dd979803.aspx#EDDAE>>, Jun., 2009, pp. 11.

Non-Final Office Action mailed Aug. 31, 2012 in U.S. Appl. No. 12/968,021, 15 pages.

Non-Final Office Action mailed Jul. 31, 2013 in U.S. Appl. No. 12/968,021, 13 pages.

Chinese Office Action mailed Nov. 5, 2013 in CN Patent App. No. 201110370740.0, 11 pages including partial translation and Concise Statement of Relevance.

Chinese Office Action mailed Dec. 2, 2013 in CN Patent App. No. 201110367803.7, 9 pages including partial translation and Concise Statement of Relevance.

Final Office Action mailed Sep. 10, 2013 in U.S. Appl. No. 12/950,627, 21 pages.

Notice of Allowance mailed Oct. 23, 2013 in U.S. Appl. No. 12/968,021, 9 pages.

Notice of Allowance mailed Mar. 17, 2014 in U.S. Appl. No. 12/950,627, 15 pages.

"Second Office Action and Search Report Issued in Chinese Patent Application No. 201110370740.0", Mailed Date: May 20, 2014, Filed Date: Nov. 21, 2011, 15 Pages including Concise Explanation of Relevance and/or partial translation.

"Second Office Action Issued in Chinese Patent Application No. 201110367803.7", Mailed Date: Aug. 7, 2014, 6 pages, including partial translation.

"Third Office Action Issued in Chinese Patent Application No. 201110367803.7", Mailed Date: Jan. 22, 2015, 6 pages.

* cited by examiner

Product Key Generation

BCDFG-HJK(N)M-PQRTV-WXY23-46789

| Offset | Description | Binary Encoding |
|---|---|---|
| 0 | Group ID | 10010010010010110101 |
| 20 | Serial Number | 000010010101101001011100111110 |
| 50 | 1st Security Value | 0010110001111100110011011000111111011 |
| 90 | 2nd Security Value | 000111101001100 |
| 103 | Checksum | 0011000010 |
| 113 | Upgrade Bit | 0 |

User Computer

Activation Server

Enhanced Security Server

SECURE SOFTWARE PRODUCT IDENTIFIER FOR PRODUCT VALIDATION AND ACTIVATION

BACKGROUND

Software products such as operating systems and application programs often contain materials that are protected under copyright law, which grants the author of a piece of original work (e.g., software code) exclusive rights over the usage and distribution of the work. To obtain a copy of a software product from a vendor who owns rights to that software product, a user typically enters into a license agreement with the vendor, which governs how the user may use and/or distribute the software product. For example, the license agreement may restrict the number of times a user can install the software and/or the number of computers on which the software can be installed.

Unauthorized copies of software products may be very damaging to vendors selling licenses to those products. To prevent use of unauthorized copies, software vendors often require that an "activation" process be completed when an attempt is made to install a copy of a software product. This process may be designed to determine whether the copy is authorized for installation (e.g., whether the copy was legitimately purchased by the user) and/or whether the installation is in compliance with one or more applicable license agreements (e.g., whether the user has exceeded a maximum number of permitted installations). Where a software product is offered in multiple editions (e.g., professional and home editions), the activation process may also identify the edition purchased by the user and selectively enable one or more features in the software product according to the identified edition.

Some conventional software activation techniques make use of a so-called "product key," which is a piece of information made available to a user when the user legitimately purchases or otherwise legitimately obtains a copy of a software product. During the activation process, the user provides the product key as "proof" of legitimacy. When such proof is accepted or validated, the user is given permission to complete the installation, and appropriate features in the software product are enabled depending on the license(s) granted to the user for that particular installation.

SUMMARY

The inventors have recognized and appreciated a significant design constraint in a software product validation and activation system, namely, the product key may be limited to a size (or length) that is capable of easy manipulation (e.g., reading and/or copying) by a human user. The inventors have further recognized and appreciated limitations of existing product key implementations related to the use of shorter product keys, such as compromises in security, performance, extensibility, and/or manageability.

Accordingly, in some embodiments, improved systems, methods and apparatus are provided for software product validation and activation, which incorporate into a product key additional identifying information (e.g., information other than a serial number) that may be used to facilitate validation of the product key. For example, the additional identifying information may serve as one or more indices for identifying a cryptographic algorithm, and/or parameters for the cryptographic algorithm, to be used in validating the product key. Such a system may be more efficient and easily extensible, because the particular cryptographic algorithms and/or parameters need not be hardcoded into a product key validation component.

The inventors have further recognized and appreciated that the security of a software product validation and activation system may be maintained or even enhanced when additional identifying information is incorporated into product keys. For instance, a sufficient level of security may be achieved by performing product key validation at least partially at a remote activation server, so that an attempted brute force attack may be slowed down by network requests. Such an activation server may also be able to keep track of how many times each individual product key is used.

The inventors have further recognized and appreciated that an activation server may be vulnerable to attacks because the activation server may be accessible from the Internet (e.g., the activation server may accept activation requests in the form of web requests). Therefore, it may be desirable to introduce an additional layer of security, for example, by incorporating into product keys additional security information to be verified by an entity other than the activation server. Accordingly, in some embodiments, an enhanced security server may be provided for validating product keys in addition to an activation server. Information used by the enhanced security server may not be accessible to the activation server and therefore may remain secure even when the activation server is successfully attacked. This additional security mechanism may prevent a complete system failure in the event of a breach at the activation server, thereby allowing system developers more time to respond to the breach.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The accompanying drawings are not necessarily drawn to scale. For purposes of clarity, not every component may be labeled in every drawing.

DETAILED DESCRIPTION

The inventors have recognized and appreciated a number of challenges in implementing a robust and secure system for validating and activating software products using product keys. Some of these challenges are explained below with reference to FIG. 1.

Figure 1:
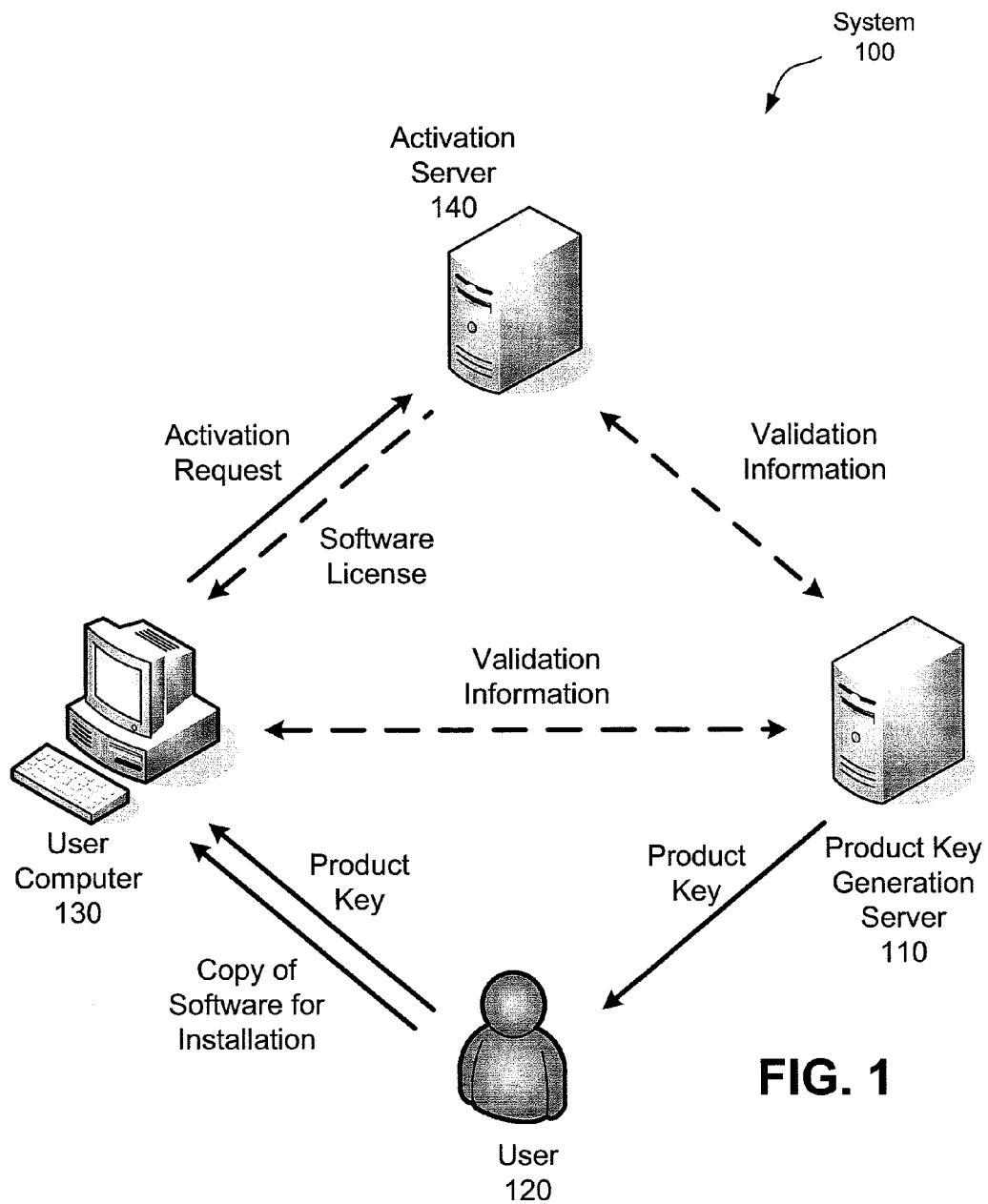
FIG. 1 shows an illustrative system for validating and activating software products, in accordance with some embodiments of the present disclosure.

FIG. 1 shows an illustrative system 100 for validating and activating software products, in which various inventive concepts disclosed herein may be implemented. In this example, the system 100 includes a product key generation server 110, which may be operated by a software vendor or some other suitable third party. When a user 120 legitimately purchases or otherwise legitimately obtains a copy of a software product, such as an operating system or an application program, a product key generated by the generation server 110 may be conveyed to the user. For instance, when the copy is sold via a physical medium such as a Compact Disc (CD), the product key may be printed on a portion of the packaging material that is accessible only after purchase (e.g., protected by a shrink wrap).

In some implementations, a product key may include two components: an identification component for identifying a specific copy of a software product (or a group of copies in case of a corporate license), and a security component that can be used to verify that the product key was generated by some proper authority (e.g., the software vendor) and/or has not be tampered with during distribution. For example, the identification component may include a serial number, and the security component may include an electronic signature over the serial number that is generated using a secret key of the software vendor.

When the user 120 attempts to install the copy of the software product on a user computer 130, an installation program running on the user computer 130 may prompt the user 120 to enter the product key. Upon receiving the product key, the installation program may process the product key and send an activation request to an activation server 140 based on information derived from processing the product key. For instance, depending on the particular implementation, the installation program may fully or partially validate the product key (e.g., by using a public key of the software vendor to verify that the security component is a valid signature over the identification component). Alternatively, or additionally, the installation program may send the product key and/or information derived therefrom to the activation server 140 (e.g., as part of the activation request), so that the activation server 140 may also fully or partially validate the product key. In other words, validation of the product key may be distributed between the user computer 130 and the validation server 140 in any suitable manner.

To validate the product key, the user computer 130 and/or the validation server 140 may share some validation information with the product key generation server 110. In one example, where a product key includes a serial number and an electronic signature over the serial number, the validation information may include a public key that is associated with the secret key used to generate the electronic signature. This public key may enable the user computer 130 and/or the validation server 140 to perform signature verification to determine whether the electronic signature is likely to have been generated properly using the associated secret key.

If the product key is validated, the activation server 140 may select one or more applicable licenses and notify the user computer 130 of the selected licenses. For example, the licenses may be selected based on a type of the software product, an edition of the software product, a family of software products to which the software product belongs, a channel via which the copy of the software product is distributed (e.g., retail, original equipment manufacturer, or volume), and/or other suitable information. The user computer 130 may then associate the licenses with the installed copy of the software product and selectively enable features in the software product according to the licenses.

The inventors have recognized and appreciated a significant design constraint in a software product validation and activation system, namely, the size (or length) of the product key. For instance, with reference to the system 100 shown in FIG. 1, if a product key is disseminated to the user 120 through a printed medium (e.g., as a code printed inside a shrink-wrapped package), the user may be expected to read the product key from the printed medium and manually enter the product key into the computer 130. This process may be time consuming and error prone, and therefore it may be desirable to limit the product key to a manageable size (e.g., no more than 20, 25, 30, or 40 alphanumeric characters or other symbols).

The inventors have further recognized and appreciated limitations of existing product key implementations related to the use of shorter product keys. For example, in some implementations, fewer bits in the product key are devoted to the security component of the product key (e.g., by using shorter digital signatures), so that more information may be encoded into the identity component. This approach may compromise security of the product key, because it may become easier for an attacker to discover a string of characters that happen to be a valid product key by repeatedly trying randomly generated strings of characters of an appropriate length. The security risk may be especially acute where validation of the product key occurs entirely on a local computer (e.g., the user computer 130 shown in FIG. 1), because a brute force attack may be conducted in that setting without making any network requests that may slow down the attack. Furthermore, where validation of a product key occurs entirely on a local computer, the local computer may be able to validate only those product keys for which the local computer has access to sufficient validate information. For instance, in some implementations, the local computer may be able to validate a product key containing a digital signature only if the local computer has access to a corresponding signature verification algorithm and/or a corresponding public key. As a result, an upgrade of the security mechanism used to generate product keys may involve dissemination of new validation information such as new cryptographic algorithms and/or keys to many local computers, which may be costly and burdensome and may discourage adoption of improved security mechanisms.

By contrast, in some other implementations, more bits in the product key are devoted to the security component of the product key (e.g., by using longer digital signatures), so that brute force attacks may become more difficult. However, the increased security may come at the expense of decreased performance, because less information may be encoded into the identification component of the product key. For example, the identification component may carry only a serial number for a specific copy of a software product, without other identifying information. As a result, the product key may not carry all the information used during validation. An example of other identifying information that could be included in a product key is a so-called "group ID" that identifies a type of the software product, an edition of the software product, a family of software products to which the software product belongs, a channel via which the copy of the software product is distributed, and/or other relevant characteristics of the software product. Such identifying information may serve as an index for retrieving a public key to be used to verify an electronic signature contained in the product key. Without direct access to such information, a trial-and-error validation process may be conducted to iterate through a set of possible public keys until a successful verification is encountered, or until the set of possible public keys are exhausted (in which case the product key may be invalidated). This iterative process may cause significant performance degradation, because cryptographic operations such as signature verifications may be computationally intensive.

Limiting the amount of identifying information carried in a product key may have further disadvantages, as there may be a smaller range (or smaller ranges) from which valid serial numbers can be drawn. For instance, to simplify code development and data management, a software vendor may wish to adopt some numbering convention, for example, by assigning a range of numbers to each software product and further assigning sub-ranges to respective editions of products. If the size of a serial number is limited, product managers may wish to more closely forecast the total number of serial numbers needed for each product and/or edition (e.g., by anticipating sales volumes), so as to reduce the amount of "wasted numbers" (e.g., potential serial numbers set aside for a product but not actually associated with any copy of the product) and thereby accommodate more products. Such forecasting may be difficult and inherently inaccurate. If an assigned range is unexpectedly exhausted, code changes may be needed (e.g., via service packs) at various system components that rely on the numbering convention, which may be costly and burdensome.

In short, the inventors have recognized and appreciated a need for improved systems for software product validation and activation, for example, to enhance security, performance, extensibility, and/or manageability. Preferably, an improved system may be backward compatible, such as being capable of concurrent or joint deployment with an existing product key implementation and/or allowing re-use of existing system components with minimal code changes.

In some embodiments, an improved system for software product validation and activation is provided that incorporates into a product key additional identifying information (e.g., information other than a serial number) that may be used to facilitate validation of the product key. For example, the additional identifying information may identify a type of the software product, an edition of the software product, a family of software products to which the software product belongs, a channel via which the copy of the software product is distributed, and/or other relevant characteristics of the software product. Such information may serve as one or more indices for identifying a cryptographic algorithm, and/or parameters for the cryptographic algorithm, to be used in validating the product key. The inventors have recognized and appreciated that the inclusion of such additional identifying information may substantially speed up the validation process by facilitating easy retrieval of validation information (e.g., without the conventional trial-and-error process). Furthermore, the inclusion of such additional identifying information may result in a system that is more easily extensible, because the particular cryptographic algorithms and/or parameters may no longer be hardcoded into a product key validation component. That is, future changes in cryptographic algorithms and/or parameters may be more easily implemented, with little or no code changes in a product key validation component.

The inventors have further recognized and appreciated that the security of a software product validation and activation system may be maintained or even enhanced when additional identifying information is incorporated into product keys. For instance, as noted above, a brute force attack may be slowed down by delays relating to network requests. Therefore, a sufficient level of security may be achieved by performing product key validation at least partially at a remote activation server (e.g., as opposed to full validation at the local computer on which the software installation is attempted). Furthermore, because the particular cryptographic parameters may not be known to an attacker (e.g., the attacker may not be able to efficiently map the additional identifying information to corresponding cryptographic parameters), it may be more difficult for the attacker to guess a valid product key. Because of such enhancements in security, more bits in a product key may be allocated to the identification component, which in turn may enlarge the space of available product keys and reduce the need for product key range forecasting or problems that arise when such forecasts are exceeded. For example, in some implementations, close to half of the bits in a product key may be allocated to the identification component, increasing the number of available product keys to over a quadrillion.

The inventors have further recognized and appreciated that an activation server may be vulnerable to attacks because the activation server may be accessible from the Internet (e.g., the activation server may accept activation requests in the form of web requests). A successful attack on an activation server may lead to compromise of information that may be used by the attacker to generate valid product keys. Therefore, it may be desirable to introduce an additional layer of security, for example, by incorporating into product keys additional security information to be verified by an entity other than the activation server. Accordingly, in some embodiments, an enhanced security server may be provided for validating product keys in addition to an activation server. Information used by the enhanced security server may not be accessible to the activation server and therefore may remain secure even when the activation server is successfully attacked. This additional security mechanism may prevent a complete system failure in the event of a breach at the activation server, thereby allowing system developers more time to respond to the breach.

Following below are more detailed descriptions of various concepts related to, and embodiments of, inventive systems, methods and apparatus for software product validation and activation. It should be appreciated that various concepts introduced above and discussed in greater detail below may be implemented in any of numerous ways, as the disclosed concepts are not limited to any particular manner of implementation. For instance, the present disclosure is not limited to the particular arrangements of components shown in the various figures, as other arrangements may also be suitable. Such examples of specific implementations and applications are provided solely for illustrative purposes.

Figure 2:
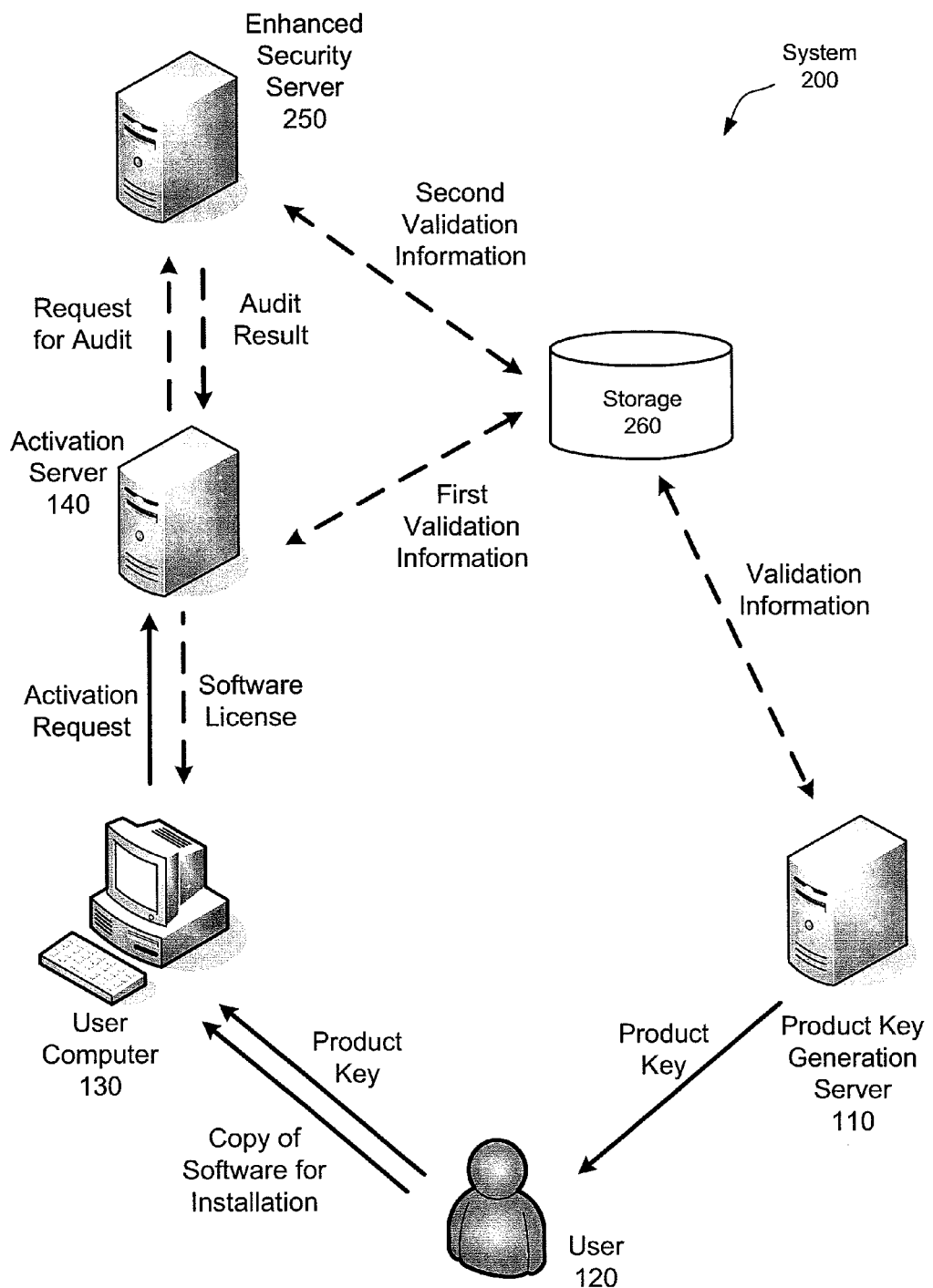
FIG. 2 shows another illustrative system for validating and activating software products, in accordance with some embodiments of the present disclosure.

FIG. 2 shows an example of an illustrative system 200 for validating and activating software products, in which various inventive concepts disclosed herein may be implemented. Similar to the example shown in FIG. 1, the illustrative system 200 includes a product key generation server 110, a user 120, a user computer 130, and an activation server 140. Additionally, the illustrative system 200 includes an enhanced security server 250 for validating product keys in conjunction with the activation server 140.

In some embodiments, the product key generation server 110 may be operated by a software vendor or some other suitable authority to generate product keys to be distributed to legitimate users of software products. The product key generation server 110 may use any suitable technique or combination of techniques to generate product keys. For example, as discussed above, the product key generation server 110 may include in a product key an identification component, which may include a serial number to be associated with a specific copy of a software product and a "group ID" that identifies a type of the software product, an edition of the software product, a family of software products to which the software product belongs, a channel via which the copy of the software product is distributed, and/or other relevant characteristics of the software product. The product key generation server 110 may also include in the product key a security component that may be used to verify the integrity and/or authenticity of the identification component. For example, in some embodiments, the security component may include an electronic signature over part or all of identification component, where the electronic signature is generated using a secret key of the product key generation server 110. In some further embodiments, the security component may include a ciphertext generated by encrypting part or all of identification component using a secret key of the product key generation server 110. Any suitable encryption algorithm may be used, including, but not limited to, a symmetric encryption algorithm such as the Advanced Encryption Standard (AES), an asymmetric encryption algorithm such as an elliptic curve cryptography (ECC) encryption algorithm, and/or any suitable combination of algorithms. In yet some further embodiments, the security component may include a hash value generated based on part or all of identification component and a secret key of the product key generation server 110. Any suitable hash algorithm may be used, including, but not limited to MD4, MD5, SHA-1, SHA-256, or SHA-512. In yet some further embodiments, the security component may include a random or pseudo-random value to be associated with the identification component.

For enhanced security, the security component of a product key may, in some implementations, include two or more security values to be verified respectively by two or more separate entities, so as to avoid a single point of failure in the system. For instance, with reference to FIG. 2, the product key generation server 110 may include in the security component of a product key two security values to be verified respectively by the activation server 140 and the enhanced security server 250. The two security values may be generated in any suitable manner. For example, the security values may be generated based on the same portion or different portions of the identification component, using one or more of the techniques described above (e.g., signature, encryption, hashing, and/or random generation). Furthermore, the security values may be generated using different techniques, or using the same technique but with different parameters (e.g., different secret keys). In this manner, even if one validation authority (e.g., the activation server 140) is compromised, a complete system failure may be avoided. For instance, an attacker may not be able to freely activate illegitimate copies of software products because counterfeit product keys may still be invalidated by an uncompromised validation authority (e.g. the enhanced security server 250). This may allow system developers more time to develop and distribute one or more service patches to close a vulnerability exploited by the attacker.

Further details of an illustrative process for generating product keys are discussed below in connection with FIGS. 3A-B. It should be appreciated that aspects of the present disclosure related to the generation of product keys are not limited to any particular generation technique. For example, product keys may be generated using any one or combination of the techniques described above and/or other suitable techniques. Furthermore, the techniques described above may be adapted and/or modified in any suitable way depending on a particular implementation. For example, a security value generated by signing, encryption, and/or hashing may be truncated to some appropriate length based on the amount of space (e.g., number of bits) in a product key that is allocated to the security value.

As discussed above in connection with FIG. 1, when the user 120 legitimately purchases or otherwise legitimately obtains a copy of a software product, a product key generated by the product key generation server 110 may be conveyed to the user, for example, as a code printed on packing material protected by shrink wrap. Alternatively, the user may be given a password for downloading the product key from a web link. Other methods of dissemination may also be suitable.

When the user 120 attempts to install the copy of the software product on the user computer 130, an installation program running on the user computer 130 may prompt the user 120 to enter the product key. Upon receiving the product key, the installation program may process the product key and send an activation request to the activation server 140 based on information derived from processing the product key. As discussed above, it may be desirable to defer at least a portion of the product key validation process to an entity other than the user computer 130, so as to slow down a possible brute force attack and/or prevent other attacks that may be possible where validation is performed entirely locally. Accordingly, in some embodiments, at least a portion of the product key validation process may be performed by the activation server 140. The installation program on the user computer 130 may not perform any validation, or may perform some initial check to catch any typographical error (e.g., by performing a checksum verification). This latter approach may be advantageous because users commonly make mistakes when typing in product keys and it may desirable to catch such simple errors before incurring further delays in communicating with the activation server 140. That is, the user computer 130 may not send any activation request to the activation server 140 unless an initial check indicates the product key is likely to have been typed in correctly.

Another advantage of deferring validation to the activation server 140 may be that the installation program on the user computer 130 may be more easily implemented and/or maintained. For instance, in the example of FIG. 2, the installation program may no longer need to store and maintain validation information from the product key generation server 110. Examples of such validation information include, but are not limited to, one or more cryptographic algorithms (e.g., signature verification, decryption, and/or hashing algorithms) and/or one or more parameters for the algorithms (e.g., keys to be used in signature verification, decryption, and/or hashing). As a result, any changes to the validation information (e.g., upgrading to more secure algorithms and/or refreshing keys) may be implemented with no or few code changes to the installation program.

Further details of an illustrative process performed by an installation program running on a user computer are discussed below in connection with FIG. 4.

Referring again to FIG. 2, the activation server 140 may receive from the user computer 130 an activation request that may include the product key typed in by the user 120 and/or information derived from the product key. For instance, in some embodiments, the activation server 140 may receive via the activation request a serial number, a group ID, and at least one security value that are extracted from a product key by the user computer 130. Alternatively, or additionally, the activation server 140 may receive the product key and perform its own processing to recover those pieces of information.

As discussed above, information extracted from the product key (e.g., the serial number and/or group ID) may be used to identify and/or retrieve validation information (e.g., one or more cryptographic algorithms and/or parameters for the cryptographic algorithms) to be used in validating the product key. In the example shown in FIG. 2, the activation server 140 may use the serial number and/or group ID to retrieve validation information from a storage 260. For instance, in an implementation based on electronic signature, the activation server 140 may use the serial number and/or group ID to retrieve from the storage 260 an identification of a signature verification algorithm and/or a verification key. Similarly, an identification of a decryption algorithm and/or a decryption key may be retrieved in an implementation based on encryption, an identification of a hashing algorithm and/or a secret key may be retrieved in an implementation based on hashing, and a randomly or pseudo-randomly generated value that has been associated with the particular product key may be retrieved in an implementation based on random generation.

In this manner, the activation server 140 may be able to handle different types of security mechanisms in a modular fashion, thereby allowing software vendors more flexibility in selecting different security mechanisms according to their particular needs. For instance, in some embodiments, different software vendors may share the overall product key implementation but use different algorithms and/or parameters. Alternatively, or additionally, the same software vendor may use different algorithms and/or parameters for different products or different editions, families, or other suitable classifications of products. For instance, a more secure algorithm may be selected if a product is associated with a high risk of copying (e.g., a popular video game), whereas a more efficient algorithm may be selected for a product anticipated to generate a high volume of activation requests (e.g., a popular operating system).

In the example shown in FIG. 2, some or all of the validation information may be stored in the storage 260 by the product key generation server 110. For instance, for each generated product key, the product key generation server 110 may store some or all of the corresponding validation information in the storage 260 in a manner that facilitates later access using identifying information encoded into the product key (e.g., the serial number and/or group ID). Alternatively, the storage 260 may be managed by a central authority that selects appropriate security mechanisms for various software products and/or groups of software products. In such an embodiment, both product key generation information (e.g., signature generation, encryption, and/or hashing algorithms, and/or associated parameters) and validation information (e.g., signature verification, decryption, and/or hashing algorithms, and/or associated parameters) may by stored in the storage 260 in association with some identifying information (e.g., serial number and/or group ID), so that the product key generation server 110 may use the identifying information to access the appropriate product key generation information, and the activation server 140 may use the identifying information to access the appropriate validation information. The storage 260 may also store randomly, pseudo-randomly, or otherwise generated values associated with one or more identification components of a product key.

Further details of an illustrative process performed by an activation server to validate a product key are discussed below in connection with FIG. 5.

As discussed above, a product key may, in some embodiments, include multiple security values to be verified separately by different entities, such as the activation server 140 and the enhanced security server 250. In the example shown in FIG. 2, the enhanced security server 250 may be implemented as an auditing service that is invoked by the activation server 140. For instance, upon successfully verifying one of two security values in a product key, the activation server 140 may decide whether an audit is desired and, if so, send a request for audit to the enhanced security server 250. In response, the enhanced security server 250 may perform its own verification based on the other one of the two security values. Like the activation server 140, the enhanced security server 250 may access validation information from the storage 260, although the validation information accessed by the enhanced security server 250 may be different from the validation information accessed by the activation server 140. In some implementations, the enhanced security server 250 may perform the audit online and transmit the result back to the activation server 140, which may grant the activation request only if both verifications are successful. In other implementations, the activation server 140 may grant the activation request when its own verification is successful, and the enhanced security server 250 may perform the audit offline and may retroactively invalidate the product key.

Further details of an illustrative process performed by an enhanced security server to validate a product key are discussed below in connection with FIG. 6.

Depending on the particular implementation, the activation server 140 may select product keys for auditing in any suitable manner. For instance, the activation server 140 may make the selection randomly or pseudo-randomly. As another example, the activation server 140 may make the selection based on a type of the software product, an edition of the software product, a family of software products to which the software product belongs, a channel via which the copy of the software product is distributed, and/or other relevant characteristics of the software product that are accessible using information encoded in the identification component of the product key. As yet another example, the activation server 140 may select product keys for auditing based on a perceived level of security threat, for example, as indicated by user input or by automatic detection of one or more patterns of system activities such as frequency of requests pertaining to a particular product or groups of products, or frequency of requests received from a particular user or group of users.

Once the product key is validated (e.g., either by the activation server 140 alone, or by the activation server 140 and the enhanced security server 250), the activation server 140 may select one or more applicable licenses and notify the user computer 130 of the selected licenses. The user computer 130 may then associate the licenses with the installed copy of the software product and selectively enable features in the software product according to the licenses.

It should be appreciated that the particular implementations shown in FIG. 2 and described above are merely illustrative, as various inventive concepts disclosed herein are not limited to any particular manner of implementation. For instance, in alternative implementations, the product key generation server 110 and the activation server 140 may be operated by the same entity and/or on the same physical server. As another example, the enhanced security server 250 may be made directly accessible via some suitable network, such as an enterprise network or the Internet, either permanently or when needed (e.g., when the activation server 140 is compromised or for other reasons unavailable). Furthermore, the user 120 may, in some instances, be an individual user, but, in other instances, may be a corporate user such as an original equipment manufacturer (OEM) that installs software products on computing equipment prior to retail sales of the equipment.

Figures 3A, 3B:
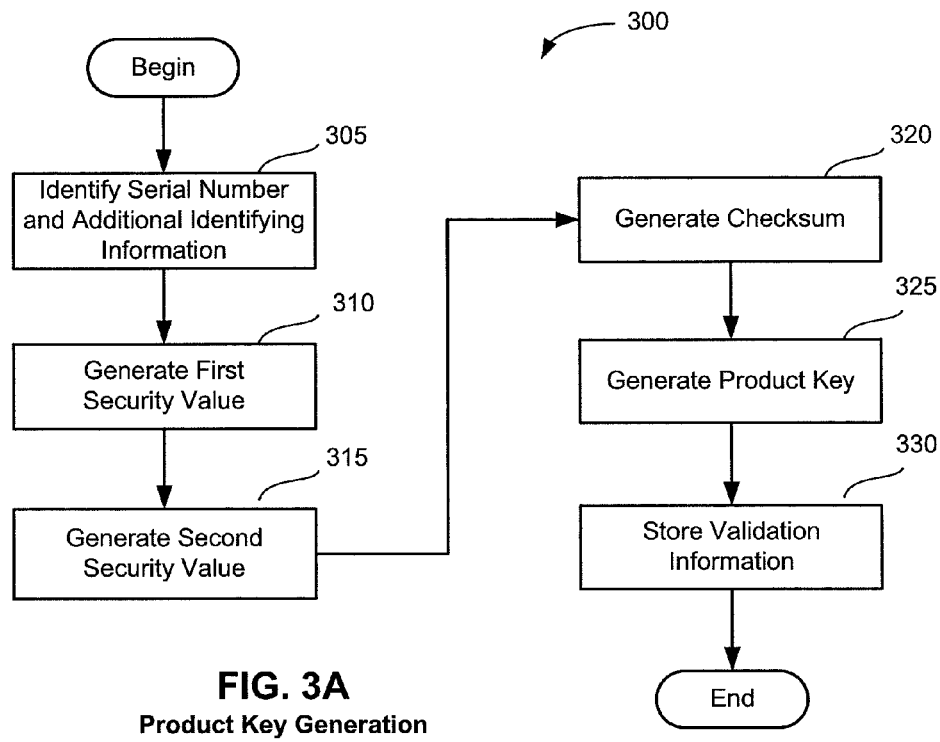
FIG. 3A shows an illustrative process for generating a product key, in accordance with some embodiments of the present disclosure.
FIG. 3B shows an example of a product key that may be generated via the process shown in FIG. 3A, in accordance with some embodiments of the present disclosure.

Turning to FIG. 3A, an illustrative process 300 for generating a product key is shown, which may be performed by the product key generation server 110 shown in FIG. 2 to generate a product key. An example of a product key 350 that may be generated via the process 300 is shown in FIG. 3B.

In the example shown in FIG. 3A, the process 300 begins at act 305 to identify a serial number for a software product. In some embodiments, the serial number may be selected from a range of numbers associated with the software product, for example, by starting from a lower end of the range and incrementing by one (or, alternatively, starting at a higher end of the range and decrementing by one) each time a serial number is assigned to a new copy of the software product. Other ways of selecting a serial number may also be suitable, such as selecting randomly or pseudo-randomly from a set of available numbers.

As explained above, the serial number alone may not carry enough information regarding the software product to allow a validation authority (e.g., the activation server shown in FIG. 2) to identify information needed for the validation process. Accordingly, in some embodiments, the product key may include additional identifying information that may facilitate efficient validation of the product key. For instance, the additional identifying information may be a group ID associated with a type of the software product, an edition of the software product, a family of software products to which the software product belongs, a channel via which the copy of the software product is distributed, and/or other relevant characteristics of the software product. More generally, a group ID may identify any group of software products that may be processed in a similar way (e.g., using the same cryptographic algorithms and/or parameters) for purposes of validation.

At act 310, a first security value may be generated based on the serial number and the additional identifying information (e.g., the group ID) using a suitable security mechanism. For instance, the serial number and/or the additional identifying information may be used to determine the security mechanism, which may be based on signature, encryption, hashing, random generation, and/or other cryptographic techniques. As a more specific example, the serial number and/or the additional identifying information may be used to determine a symmetric encryption algorithm and a secret key, and the first security value may be generated at least in part by encrypting the serial number and the additional identifying information using the symmetric encryption algorithm and the secret key. As another example, the serial number and/or the additional identifying information may be used to determine a hashing algorithm and a secret key, and the first security value may be generated at least in part by hashing the serial number and the additional identifying information, where the secret key may be used as a parameter to the hashing.

At act 315, a second security value may be generated based on the serial number and the additional identifying information. In some embodiments, the second security value may be generated using a security mechanism that is different from the mechanism used to generate the first security value. For instance, the second security value may be generated using a different cryptographic algorithm, or the same cryptographic algorithm but with different keys. Alternatively, the second security value may be generated using the same security mechanism as the first security value (e.g., using the same hashing algorithm and secret key).

At act 320, a checksum is generated based on the serial number, the additional identifying information and the first and second security values. The checksum may be generated using a cyclic redundancy check (CRC) checksum algorithm or some other suitable algorithm. As discussed above in connection with FIG. 2, the checksum may be used to determine whether a user likely made a typographical error while typing in the product key. Therefore, the checksum need not be secure against brute force attacks, and relatively few bits (e.g., no more than 10) may be adequate.

At act 325, the serial number, the additional identifying information, the first and second security values, and the checksum may be packaged together in some suitable manner to form a product key. For example, in some embodiments, a base 24 encoding with the alphabet "BCDFGHJKMPQRTVWXY2346789" may be used to encode the concatenation of the serial number, the additional identifying information, the first and second security values, and the checksum, and a special character not in the alphabet for the encoding, such as the character "N," may be inserted into a selected position in the encoded string. The resulting product key may then be stored and later be associated with a copy of a software product and conveyed to the user.

As discussed in greater detail below in connection with FIGS. 3B and 4, the position of the special character (e.g., the character "N") may by used by an installation program to determine whether to perform conventional or improved product key validation on a particular product key. The position of the special character may also indicate whether the product key has a conventional format or an improved format. Thus, the installation program may parse the product differently depending on the position of the special character.

At act 330, validation information associated with the product key may be stored in a manner that facilitates retrieval by one or more validation authorities (e.g., the activation server 140 and the enhanced security server shown in FIG. 2). For instance, validation information may be stored in association with the product key's serial number and/or additional identifying information (e.g., group ID), so that a validation authority may retrieve the validation information by providing the serial number and/or the additional identifying information.

As used herein, "validation information" may refer generally to any information that may be useful when validating a product key. For example, validation information may include an identification of one or more cryptographic algorithms to be used to validate the product key and/or one or more associated parameters (e.g., keys). Preferably, validation information relating to the first and second security values may be stored as separate units, so that an entity responsible for verifying the first security value (e.g., the activation server 140 shown in FIG. 2) may not have access to validation information relating to the second security value. In this manner, validation information relating to the second security value may remain secure even if the entity responsible for verifying the first security value is successfully attacked.

As another example, validation information may include the security values themselves, so that validation may be performed simply by comparing the security values extracted from the product key against the security values retrieved using the serial number and/or the additional identifying information of the product key. This approach of storing the security values themselves may be suitable in an implementation where the security values are randomly or pseudo-randomly generated, or where the same security mechanism is used to generate the first and second security value at acts 310 and 315. In the latter situation, it may desirable not to reveal the security mechanism to a validation authority (e.g., the activation server 140 shown in FIG. 2), so to prevent compromise of the security mechanism in the event of a successful attack on the validation authority.

FIG. 3B shows an illustrative product key 350 in a 5×5 format where 24 of the 25 characters are drawn from an alphabet of 24 characters "BCDFGHJK-MPQRTVWXY2346789," and a special character "N" is inserted into the $9^{th}$ position. This format may be compatible with existing product key implementations that also use the 5×5 format, and the position of the special character "N" may be used by an installation program to determine whether to perform conventional product key processing or new product processing in accordance with some embodiment of the present disclosure.

In some embodiments, the product key 350, with the special character "N" removed, may be decoded into a string of 114 bits, for example, as shown in the table 355 in FIG. 3B. The first 50 bits in the bit string may correspond to an identification component of the product key, with the first 20 bits representing a group ID 360 and the remaining 30 bits representing a serial number 362. The next 63 bits may correspond to a security component of the product key, where 40, 13 and 10 bits are allocated respectively to the first security value 364, the second security value 366, and the checksum 368. The final bit 370 may indicate whether the copy of the software product associated with the product key is distributed via a retail channel (also denoted "FPP") or an upgrade channel (also denoted "CCP").

Note that, in the example shown in FIG. 3B, close to half of the bits (or, 50 out of 114, about 45 percent, or over 40 percent) in the product key 350 are allocated to the identification component. As a result, over a quadrillion numbers (e.g., 0 to $2^{50}-1$) are available for the group ID and serial number combination, which greatly reduces the need for accurate product key range forecasting.

It should be appreciated that the process 300 shown in FIG. 3A and the product key 350 shown in FIG. 3B are merely illustrative, as other ways of generating product keys and/or other formats for product keys may also be used in various embodiments of the present disclosure. For example, some product key implementations may make use of "self-verifying" product keys, which carry sufficient information for validation, so that a validation authority need not retrieve validation information from a separate source.

Figure 4:
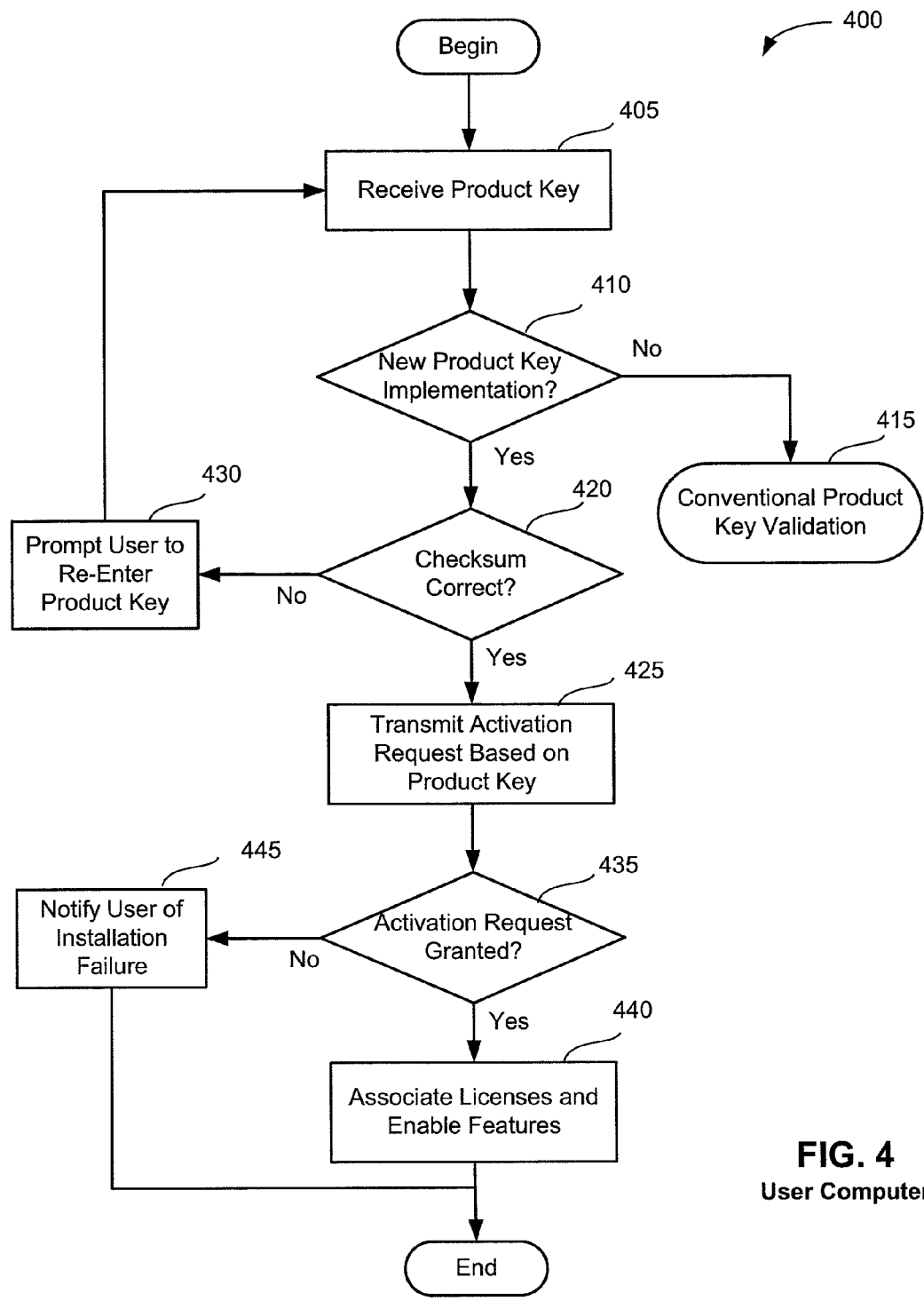
FIG. 4 shows an illustrative process that may be performed by an installation program on a user computer in response to a user's attempt to install a copy of a software product, in accordance with some embodiments of the present disclosure.

FIG. 4 shows an illustrative process 400 that may be performed by an installation program on a user computer in response to a user's attempt to activate a copy of a software product. For example, the process 400 may be performed by the user computer 130 shown in FIG. 2 during installation of a copy of a software product for the user 120.

The process 400 may begin at act 405 to prompt the user for a product key associated with the copy of the software product being installed and receive the product key via an input device such as a keyboard or a mouse. At act 410, the process 400 may determine whether the product is generated using a conventional product key implementation, or a new product key implementation incorporating one or more inventive concepts described in the present disclosure. For example, in one embodiment the process 400 may scan the product key for a special character such as the letter "N." If the letter "N" is found at a pre-determined position (e.g., at or near bit offset 50, where the security component or payload of the product key begins), the product key may be determined to be associated with a new implementation. Otherwise, the product key may be associated with an existing implementation and the process 400 may proceed as subprocess 415 to perform conventional product key validation. In another embodiment, the mere presence of a special character such as the letter "N" may indicate that the product key is to be associated with a new implementation, and the position of the special character within the product key may provide additional information that can be used to validate the product key. For instance, the position of the special character may be used to encode one or more bits in addition to the bits encoded using the base 24 alphabet, thereby effectively increasing the information carrying capacity of the product key.

If the product key is determined to be associated with a new implementation, the process 400 may proceed to act 420 to perform a checksum verification. For example, with reference to an embodiment shown in FIG. 3B, the process 400 may decode the product key into binary format and verify whether the 10 bits of information in the product key starting at bit offset 103 is a correct checksum of the remainder of the product key or any suitable portion thereof. For instance, the 10-bit checksum may be verified against the first 103 bits of the product key and/or the upgrade bit.

If the checksum is determined to be correct at act 420, the user is likely to have typed in the product key correctly, and the process 400 may proceed to act 425 to transmit an activation request to a suitable validation authority (e.g., the validation server 140 shown in FIG. 2). Depending on the particular embodiment, the activation request may include the product key itself and/or the bit strings corresponding to one or more constituent parts of the product key, such as the group ID, the serial number, the first security value, and/or the second security value.

If, on the other hand, the checksum is determined to be incorrect at act 420, the process may proceed to act 430 to prompt the user to re-enter the product key and then return to act 405 to process the user's next attempt at entering the product key.

At act 435, the process 400 may receive notification from the validation authority regarding the status of the activation request transmitted at act 425. If the request is denied, the process 400 may proceed to act 445 to notify the user of a failure to complete installation using the product key provided. Otherwise, the process 400 may proceed to act 440 to identify one or more licenses granted by the validation authority and enable one or more features in the software product according to the granted licenses.

Figure 5:
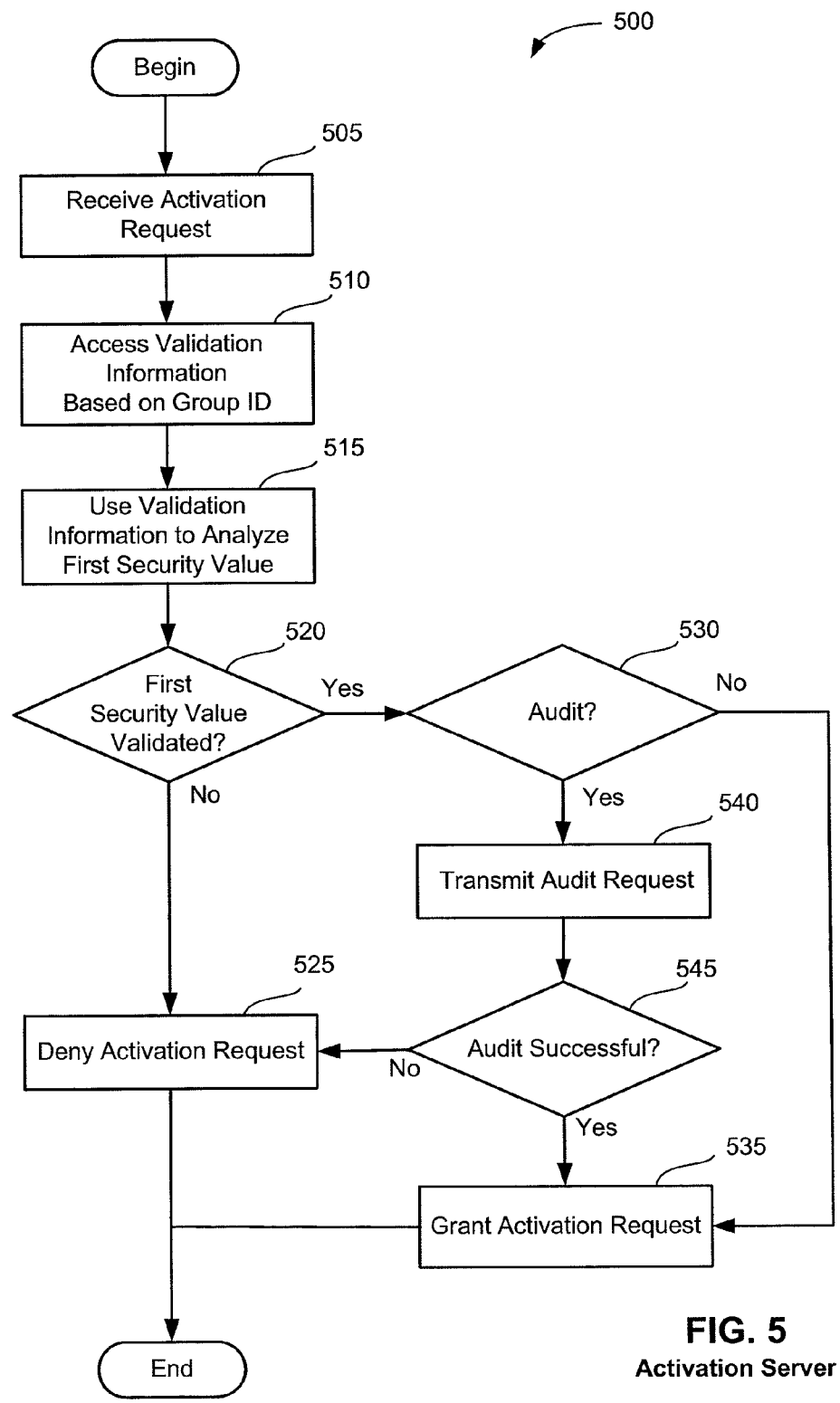
FIG. 5 shows an illustrative process that may be performed by a validation authority in response to receiving an activation request from a computer on which a user is attempting to install a copy of a software product, in accordance with some embodiments of the present disclosure.

Referring to FIG. 5, an illustrative process 500 is shown that may be performed by a validation authority (e.g., the validation server 140 shown in FIG. 2) in response to receiving an activation request from a computer (e.g., the user computer 130 shown in FIG. 2) on which a user is attempting to install a copy of a software product.

In this example, the process 500 begins at act 505 to receive an activation request, which may include a product key in its entirety and/or various relevant portions of the product key, such as a group ID, a serial number, a first security value, and/or a second security value, as shown in FIG. 3B. At act 510, the process 500 may use some of the identifying information from the product key, such as the group ID, to access validation information relating to the first security value. For example, the process 500 may contact a storage for validation information (e.g., the storage 260 shown in FIG. 2) using a Uniform Resource Locator (URL) having the group ID encoded therein.

Having obtained the relevant validation information, the process 500 may proceed to act 515 to analyze the first security value. For example, in an embodiment where the first security value was generated by encrypting the serial number and the group ID using a secret key, the validation information accessed by the process 500 may include an identification of a decryption algorithm corresponding to the encryption algorithm used (or, alternatively, program code implementing the decryption algorithm) and a secret key to be used as a parameter to the decryption algorithm. In that instance, the process 500 may, at act 520, decrypt the first security value using the accessed validation information and compare the result against the serial number and the group ID. If the serial number and group ID match the decrypted first security value, the product key may be considered validated (at least provisionally), and the process 500 may proceed to act 530 to handle possible auditing. If, on the other hand, the serial number and group ID are determined not to match the decrypted first security value, the process 500 may proceed to act 525 to notify the computer sending the activation request that the activation request has been denied.

Alternatively, or additionally, the validation information accessed by the process 500 may include an identification of the encryption algorithm used (or, alternatively, program code implementing the encryption algorithm) and the secret key used as a parameter to the encryption algorithm. In that instance, the process 500 may perform its own encryption of the serial number and the group ID and compare the result against the first security value at act 520. If the first security value matches the ciphertext generated by the process 500, the product key may be considered validated (at least provisionally), and the process 500 may proceed to act 530 to handle possible auditing. If, on the other hand, the first security value is determined not to match the ciphertext generated by the process 500, the process 500 may proceed to act 525 to notify the computer sending the activation request that the activation request has been denied.

In yet another embodiment, where the first security value was generated by hashing the serial number and group ID using a secret key, the validation information accessed by the process 500 may include an identification of the hashing algorithm used (or, alternatively, program code implementing the hashing algorithm) and the secret key used as a parameter in generating the first security value. The process 500 may then, at act 520, perform its own hashing of the serial number and group ID and compare the result against the first security value. If the first security value matches the hash of the serial number and group ID generated by the process 500, the product key may be considered validated (at least provisionally), and the process 500 may proceed to act 530 to handle possible auditing. If, on the other hand, the first security value is determined not to match the hash of the serial number and group ID generated by the process 500, the process 500 may proceed to act 525 to notify the computer sending the activation request that the activation request has been denied.

As discussed above, a decision of whether to audit a particular product key may be made in various manners, such as by random selection and/or based on a perceived level of security threat. If it is determined at act 530 that the product key is to be audited, the process 500 may proceed to act 540 to transmit an audit request to an audit authority (e.g., the enhanced security server 250 shown in FIG. 2) and receive an audit response at act 545. If the audit was successful, or if at act 530 it is determined that no audit is needed, the process 500 may proceed to act 535 to identify one or more licenses to be granted and notify the computer sending the activation request of the granted licenses. If, on the other hand, the audit was unsuccessful, the process 500 may proceed to act 525 to notify the computer sending the activation request that the activation request has been denied.

Figure 6:
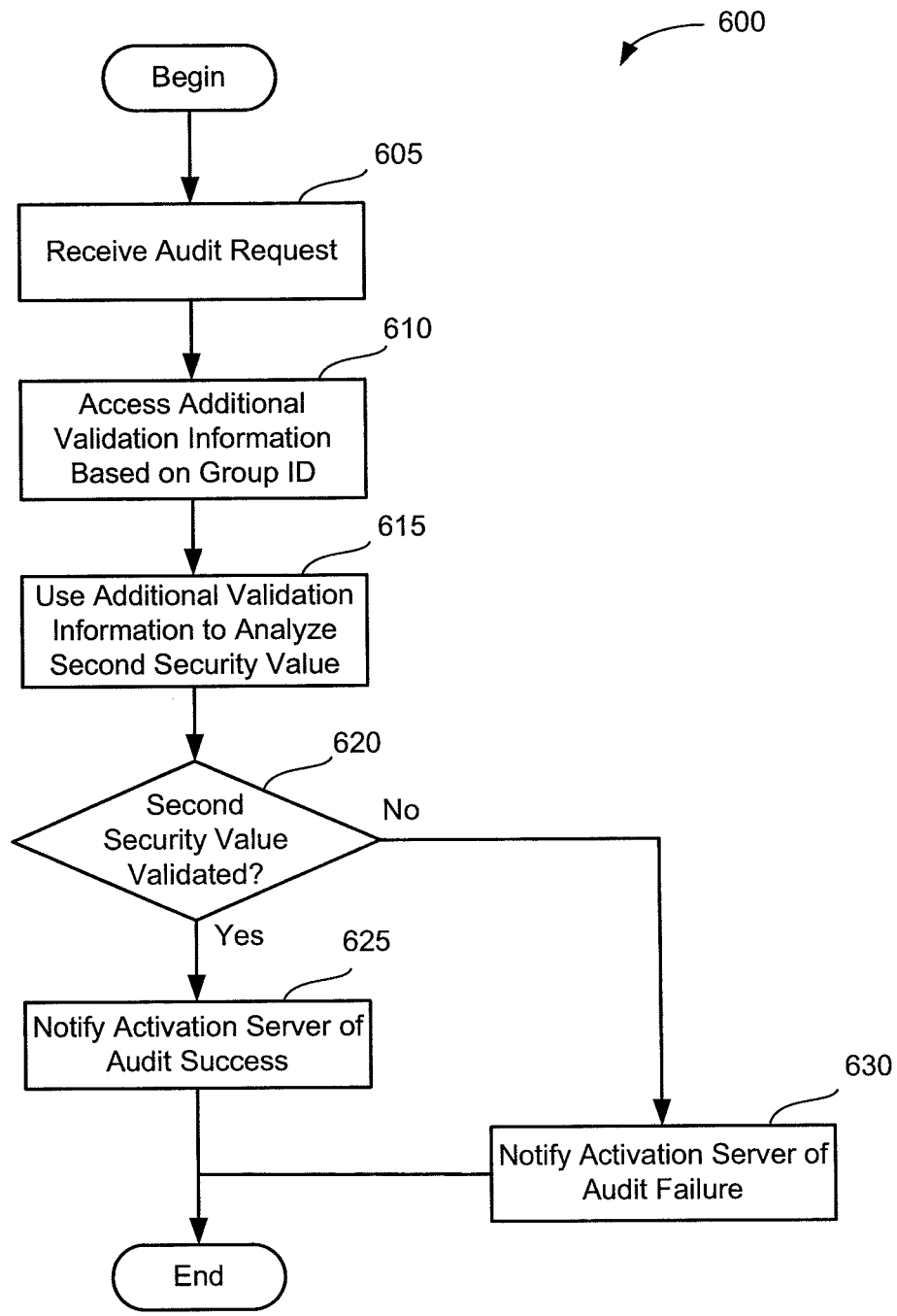
FIG. 6 shows an illustrative process that may be performed by an audit authority in response to receiving an audit request from a validation authority, in accordance with some embodiments of the present disclosure.

Referring to FIG. 6, an illustrative process 600 is shown that may be performed by an audit authority (e.g., the enhanced server 250 shown in FIG. 2) in response to receiving an audit request from a validation authority (e.g., the activation server 140 shown in FIG. 2).

In this example, the process 600 begins at act 605 to receive an audit request, which may include a product key in its entirety and/or various relevant portions of the product key, such as a group ID, a serial number, a first security value, and/or a second security value, as shown in FIG. 3B. At act 610, the process 600 may use some of the identifying information from the product key, such as the group ID, to access validation information relating to the second security value. For example, the process 600 may contact a storage for validation information (e.g., the storage 260 shown in FIG. 2) using a URL having the group ID encoded therein. Depending on the particular implementation, the process 600 may provide additional credential information in order to access validation information relating to the second security value. Such additional credential information may not be available to a front end validation authority (e.g., the activation server 140 shown in FIG. 2, which may be accessible directly from the Internet), so that validation information relating to the second security value may remain secure even in the event of a security breach at the front end validation authority Having obtained the relevant validation information, the process 600 may proceed to act 615 to analyze the second security value. For example, in an embodiment where the second security value was generated by hashing the serial number and the group ID using a secret key, the validation information accessed by the process 600 may include an identification of the hashing algorithm used (or, alternatively, program code implementing the hashing algorithm) and the secret key used as a parameter to the hashing algorithm. In that instance, the process 600 may perform its own hashing of the serial number and the group ID and compare the result against the second security value at act 620. Alternatively, the validation information accessed by the process 600 may include a randomly or pseudo-randomly generated value associated with the serial number and/or the group ID, in which case the process 600 may simply compared the randomly or pseudo-randomly generated value against the second security value.

If the second security value matches the hash (either retrieved as part of the validation information or generated by the process 600 using the retrieved validation information), the product key may be considered validated by the audit authority, and the process 600 may proceed to act 625 to notify the validation authority sending the audit request that the audit was successful. Otherwise, the process 600 may proceed to act 630 to notify the validation authority that the audit was unsuccessful.

Figure 7:
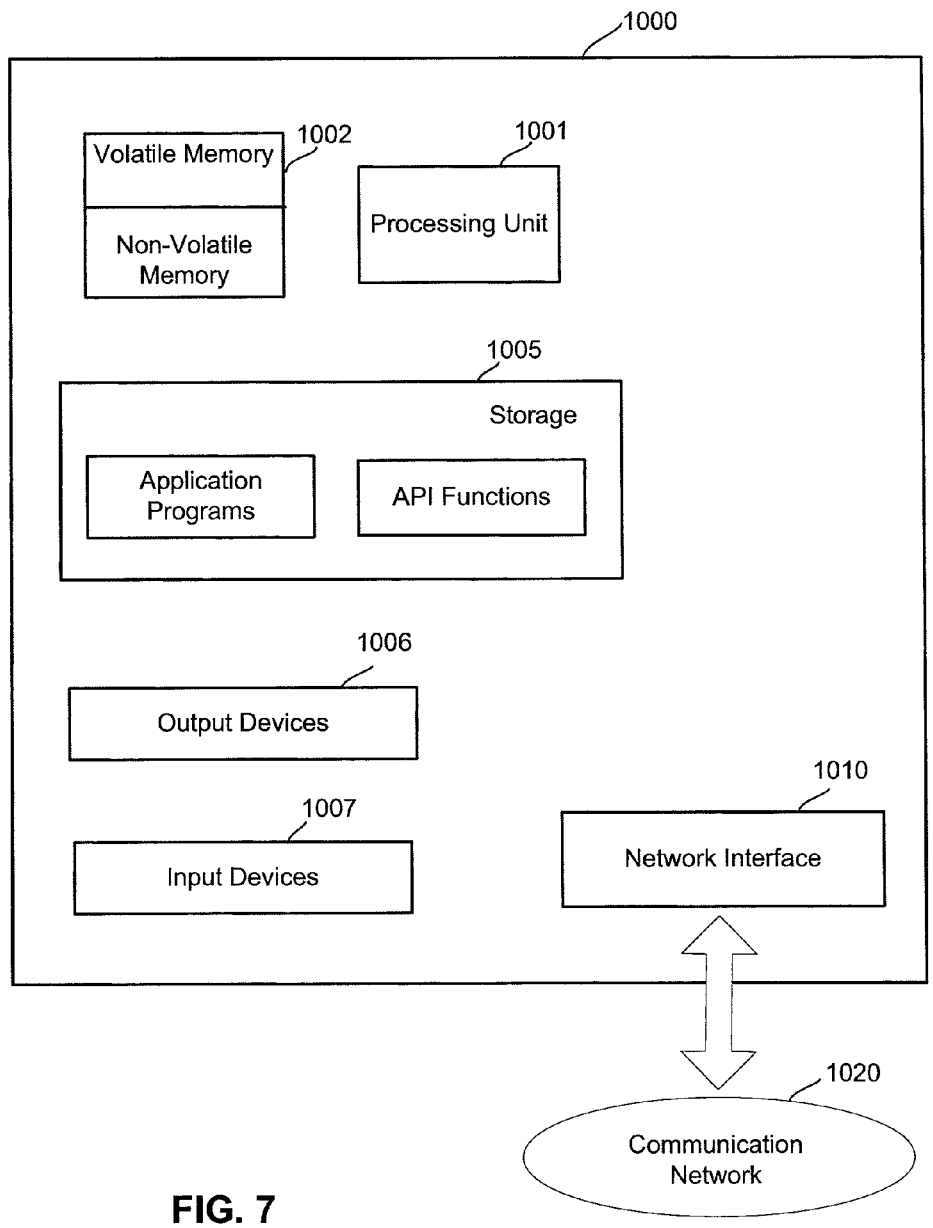
FIG. 7 shows, schematically, an illustrative computer on which various inventive aspects of the present disclosure may be implemented.

FIG. 7 shows, schematically, an illustrative computer 1000 on which various inventive aspects of the present disclosure may be implemented. For instance, any of the functionalities described herein for the product key generation server 110, the user computer 130, the activation server 140, and the enhanced security server 250 of FIGS. 1-2 may be implemented on such a computer. The computer 1000 includes a processor or processing unit 1001 and a memory 1002 that may include volatile and/or non-volatile memory. The computer 1000 may also include storage 1005 (e.g., one or more disk drives) in addition to the system memory 1002. The memory 1002 may store one or more instructions to program the processing unit 1001 to perform any of the functions described herein. The memory 1002 may also store one more application programs and/or Application Programming Interface (API) functions.

The computer 1000 may have one or more input devices and/or output devices, such as devices 1006 and 1007 illustrated in FIG. 7. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

As shown in FIG. 7, the computer 1000 may also comprise one or more network interfaces (e.g., the network interface 1010) to enable communication via various networks (e.g., the network 1020). Examples of networks include a local area network or a wide area network, such as an enterprise network or the Internet. Such networks may be based on any suitable technology and may operate according to any suitable protocol and may include wireless networks, wired networks, or fiber optic networks.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, the various methods or processes outlined herein may be coded as software that is executable on one or more processors that employ any one of a variety of operating systems or platforms. Additionally, such software may be written using any of a variety of suitable programming languages and/or programming or scripting tools, and also may be compiled as executable machine language code or intermediate code that is executed on a framework or virtual machine.

In this respect, the invention may be embodied as a non-transitory computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other non-transitory, tangible computer storage media) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags, or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

What is claimed is:

1. A system for validating product keys, comprising:
at least one memory and at least one processor that are respectively configured to store and execute instructions that:

receive a product key from an activation process of a remote computing device for a software product, wherein the product key includes:
  an identifier within the product key, wherein the identifier serves as an indication of a cryptographic algorithm and/or a parameter for the cryptographic algorithm that is to be used in validating the received product key; and
  security information associated with the identifier within the product key, wherein the security information includes at least a first security value and a second security value;
determine, based at least in part on the identifier within the product key, validation information from at least one source other than the product key, wherein the validation information defines at least part of a process for validating the product key;
execute the process for validating the product key according to the determined validation information, wherein the process for validating the product key includes:
  a determination of whether the first security value is valid;
  in response to a determination that the first security value is valid, a determination of whether the second security value is to be validated; and
  in response to a determination that the second security value is to be validated, at least a partially facilitation of validation of the second security value; and
transmit an indication of an outcome of the process to the remote computing device.

2. The system of claim 1, wherein the validation of the second security value is performed by at least one other processor.

3. The system of claim 2, wherein the validation of the second security value is at least partially based on the identifier within the product key.

4. The system of claim 1, wherein the identifier comprises a serial number associated with the software product and additional identification information that is different from the serial number, and wherein the at least one memory and at least one processor are further configured to store and execute instructions that:
  determine the validation information based at least in part on the additional identification information from the at least one source other than the product key.

5. The system of claim 4, wherein the additional identification information identifies at least one item selected from a group consisting of:
  a type of the software product;
  an edition or version of the software product;
  a family of software products to which the software product is associated; and
  a channel via which the software product is distributed.

6. A method for generating product keys with at least one processor, the method comprising:
  determining identification information for a product key, the identification information including an identification of an associated software product and an indication of a cryptographic algorithm and/or a parameter for the cryptographic algorithm that is to be used in validating the product key;
  generating security information associated with the identification information, the security information including at least:
    a first security value that is to be validated by a first validation process; and
    a second security value for selective validation according to a second validation process;
  combining at least the first security value, the second security value, and the identification information into the product key; and
  storing, in at least one storage device, validation information in association with at least some of the identification information, the validation information for use in processing the security information to validate the product key.

7. The method of claim 6, wherein
the first security value and the second security value are separately accessible from the at least one storage device.

8. The method of claim 6, wherein generating the security information comprises:
  generating at least one hash value based on at least a portion of the identification information, and wherein the validation information comprises the at least one hash value.

9. The method of claim 6, wherein the generating the security information comprises:
  encrypting at least a portion of the identification information using at least one encryption algorithm and at least one secret key, and wherein the validation information comprises an identification of the at least one encryption algorithm and the at least one secret key.

10. The method of claim 6, wherein the identification information comprises a serial number associated with the software product and additional identification information that is different from the serial number, and wherein the validation information is stored in association with the additional identification information.

11. The method of claim 6, wherein the additional identification information identifies at least one item selected from a group consisting of:
  a type of the software product;
  an edition or version of the software product;
  a family of software products that includes the software product; and
  a channel via which the software product is distributed.

12. The system of claim 1, wherein the validation information comprises at least one hash value generated based at least in part on the identifier, and wherein the process for validating the product key includes:
  a comparison of the at least one hash value with the security information; and
  a determination of the validity of the product key based at least in part on an output of the comparison.

13. The system of claim 1, wherein the validation information comprises an identification of at least one encryption algorithm and at least one secret key, and wherein the process for validating the product key includes:
  encrypting at least a portion of the identification information using the at least one encryption algorithm and the at least one secret key to obtain at least one ciphertext; and
  determining whether the security information matches the at least one ciphertext.

14. A method executed at least in part by at least one processor to validate product keys, comprising:
  receiving a product key from an activation process of a remote computing device for a software product, wherein the product key includes:
    an identifier of the software product, wherein the identifier identifies the software product and also defines at least one cryptographic algorithm and/or parameter for the cryptographic algorithm, wherein the at least one cryptographic algorithm and/or parameter for the cryptographic algorithm is for use in validating the product key; and security information that includes an encrypted version of at least a portion of the identifier, wherein the security information includes at least a first security value and a second security value;

accessing based at least in part on the identifier of the software product validation information from at least one source other than the product key, wherein the validation information defines at least part of a process for validating the product key;

validating the product key using at least the validation information to process the security information, including:

determining whether the first security value is valid;

in response to determining that the first security value is valid, determining whether the second security value is to be validated; and in response to determining that the second security value is to be validated, at least partially facilitating validation of the second security value; and transmitting an indication of an outcome of the validation of the product key to the remote computing device, wherein the indication includes either an authorization to activate the software product or a denial of authorization to activate the software product.

15. The method of claim 14, wherein the product key also includes additional security information, and wherein the method further comprises:

determining whether the validation of the product key is to be subjected to further validation; and if it is determined that the product key is to be subjected to further validation, transmitting the additional security information to at least one other processor for further validation.

16. The method of claim 15, wherein the further validation include validating the additional security information based at least in part on the identifier.

17. The method of claim 14, wherein the identifier comprises a serial number associated with the software product and additional identification information that is different from the serial number, and wherein accessing the validation information includes:

determining the validation information based at least in part on the additional identification information.

18. The method of claim 17, wherein the additional identification information identifies at least one item selected from a group consisting of:

a type of the software product;

an edition or version of the software product;

a family of software products including the software product; and a channel via which the software product is distributed.

19. The method of claim 14, wherein the validation information comprises at least one hash value generated based at least in part on the identifier and a secret key, and wherein validating the product key includes:

comparing the at least one hash value and the security information.

20. The method of claim 14, wherein the validation information comprises an identification of at least one decryption algorithm and at least one secret key, and wherein validating the product key includes:

decrypting at least a portion of the security information using the at least one decryption algorithm and the at least one secret key to obtain decrypted information; and determining whether the decrypted information matches the identifier.

* * * * *